(12) United States Patent
Grabauskas et al.

(10) Patent No.: US 6,965,559 B2
(45) Date of Patent: Nov. 15, 2005

(54) METHOD, SYSTEM, AND PROGRAM FOR DISCOVERING DEVICES COMMUNICATING THROUGH A SWITCH

(75) Inventors: Gint J. Grabauskas, Fort Collins, CO (US); Jeffrey A. Hanson, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 712 days.

(21) Appl. No.: 10/039,807

(22) Filed: Oct. 19, 2001

(65) Prior Publication Data

US 2003/0076788 A1 Apr. 24, 2003

(51) Int. Cl.[7] .......................................... G01R 31/08
(52) U.S. Cl. ..................... 370/216; 370/242; 370/465
(58) Field of Search .............................. 370/254, 351, 370/352, 353, 354, 400, 401, 402, 405, 406, 370/420, 465, 216, 242

(56) References Cited

U.S. PATENT DOCUMENTS

| | | | |
|---|---|---|---|
| 5,588,119 A | | 12/1996 | Vincent et al. |
| 6,118,776 A | | 9/2000 | Berman |
| 6,151,331 A | * | 11/2000 | Wilson ........................ 370/465 |
| 2002/0162010 A1 | * | 10/2002 | Allen et al. ................. 713/200 |
| 2002/0194407 A1 | * | 12/2002 | Kim ............................ 710/104 |
| 2003/0091037 A1 | * | 5/2003 | Latif et al. .................. 370/355 |
| 2003/0093501 A1 | * | 5/2003 | Carlson et al. ............. 709/220 |

FOREIGN PATENT DOCUMENTS

| | | |
|---|---|---|
| WO | 0130007 | 4/2001 |
| WO | 02089418 | 11/2002 |

OTHER PUBLICATIONS

QLogic Corporation. "SANbox-16STD Fibre Channel Switch." Installer's/User's Manual. Publication No. 59012 Rev. A, Aug. 2000.
QLogic Corporation. "Reducing the Complexity of Managing Private Loops," by Brent Knight, pp. 1–11.
QLogic Corporation. "SANbox-8/16." Switch Management User's Manual. Publication No. 59010-06 Rev. A, Jul. 2001.

(Continued)

*Primary Examiner*—Phirin Sam
(74) *Attorney, Agent, or Firm*—Kudirka & Jobse, LLP

(57) ABSTRACT

Provided is a computer implemented method, system, and program for discovering a topology of a switch from an initiator device. The switch includes a plurality of switch ports. A plurality of Input/Output (I/O) devices are connected to the switch ports, wherein each I/O device and the initiator device connect to the switch through one of the switch ports. The initiator and I/O devices communicate on a first network configured by the switch and the initiator device communicates with the switch over a second network. The initiator device performs submitting a first query over the first network to the switch requesting a unique address of a plurality of I/O devices that are accessible to the initiator device over the first network. In response to the first query to the switch on the first network, the unique address of each I/O device is received from the switch. A second query is submitted over the second network to the switch for information on switch ports on the switch. In response to the second query to the switch over the second network, the information on the switch ports is received. Information on a topology of the switch ports and the initiator and I/O devices having the unique address is generated.

58 Claims, 6 Drawing Sheets

OTHER PUBLICATIONS

Fibre Channel Generic Services—3 (FC-GS-3), Rev 7.01. NCITS Working Draft Proposed American National Standard for Information Technology, Nov. 28, 2000, pp. 1-244.
Rickard, W. *Fibre Channel as a Network Backbone.* WESCON/94. Idea/Microelectornics. Conference Record Anaheim, CA, USA, Sep. 27-29, 1994. New York:NY, USA, IEEE, pp. 653-659

QLogic Corporation. "SAN/Device Management API." Draft Version May 26, 2000, pp. 1-113.
Fibre Channel. Private Loop SCSI Direct Atttach (FC-PLDA), Rev. 2.1. X3 Working Draft Proposed Technical Report, Sep. 22, 1997, pp. 1-80, index pp. I-1-I-4.

* cited by examiner

METHOD, SYSTEM, AND PROGRAM FOR DISCOVERING DEVICES COMMUNICATING THROUGH A SWITCH

BACKGROUND OF THE INVENTION

1. Field of the Invention

The present invention relates to a method, system, and program for discovering devices communicating through a switch.

2. Description of the Related Art

A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. One common protocol for enabling communication among the various SAN devices is the Fibre Channel protocol, which uses optical fibers or copper wires to connect devices and provide high bandwidth communication between the devices. In Fibre Channel terms the "fabric" comprises one or more interconnected switches, such as cascading switches, that connect the devices. The link is the two unidirectional fibers, which may comprise an optical wire, transmitting to opposite directions with their associated transmitter and receiver. Each fiber is attached to a transmitter of a port at one end and a receiver of another port at the other end.

The Fibre Channel protocol defines a fabric topology. A fabric includes one or more interconnected switches, each switch having multiple ports, also referred to as F_Ports. A fiber link may connect an N_Port, or node port, on a device to one F_Port on the switch. An N_Port refers to any port on a non-switch device. An N_Port can communicate with all other N_Ports attached to the fabric to which the N_Port is connected, i.e., N_Ports on the immediate switch or interconnected cascading switches.

Another common Fibre Channel topology is the arbitrated loop. The devices in an arbitrated loop are daisy chained together. An L_Port is a port on a device that has arbitrated loop capabilities. An NL_Port is a device port that is part of a loop and capable of communicating with other N_Ports in a fabric. An FL_Port is a switch port connected to a loop. In a private loop In a public loop topology, a switch FL_Port is connected to the arbitrated loop, thereby allowing communication between the fabric devices and the loop devices. However, often legacy private loop devices are unable to communicate on a fabric because the private loop devices utilize an eight bit Arbitrated Loop Physical Address (AL_PA), and do not have the 24 bit address that is used for communication on the fabric.

To migrate legacy private loop devices that are only capable of using the eight bit AL_PA to a switched fabric, Q Logic Corporation provides the SANbox-16STD Fibre Channel switch that incorporates multiple private loop devices into a switched fabric. The QLogic switch includes multiple Segmented Loop Ports (SL_Ports), which function as FL_Ports and may have an attached private loop, also referred to as a looplet. Thus, the QLogic switch is comprised of multiple SL_Ports, where each SL port may support a separate arbitrated loop that has attached private loop devices. The SL ports on the switch and any devices attached to looplets attached to the SL_Ports are configured as a single logical Fibre Channel Arbitrated Loop (FC-AL), also referred to as a segmented loop. During initialization, the switch assigns unique eight bit Arbitrated Loop Physical Addresses (AL_PAs) to each SL_Port and to any device attached to a looplet on an SL_Port to form a segmented loop. Within a segmented loop any device within one private looplet attached to one SL_Port may communicate with any device in another private looplet attached to another SL port on the switch. Further details of the SANbox-16STD Fibre Channel switch are described in the QLogic publications "SANbox-16STD Fibre Channel Switch: Installer's/User's Manual," QLogic Publication No. 59012-03 Rev. A (August, 2000) and "Reducing the Complexity of Managing Private Loops", a White Paper (2000), downloaded from the Internet at "http://www.qlogic.com/products/pdf/private_loops.pdf", which publications are incorporated herein by reference in their entirety.

In such segmented loop environments, a systems administrator may want to understand and visualize the topology of all the devices on the segmented loop, such as the relationship of devices in looplets attached to SL_Ports on a switch, including devices in the same zone as well as other zones. Thus, there is a need in the art for improved techniques for ascertaining the topology of an arrangement of private loops attached to a switch.

SUMMARY OF THE DESCRIBED IMPLEMENTATIONS

Provided is a computer implemented method, system, and program for discovering a topology of a switch from an initiator device. The switch includes a plurality of switch ports. A plurality of Input/Output (I/O) devices are connected to the switch ports, wherein each I/O device and the initiator device connect to the switch through one of the switch ports. The initiator and I/O devices communicate on a first network configured by the switch and the initiator device communicates with the switch over a second network. The initiator device performs submitting a first query over the first network to the switch requesting a unique address of a plurality of I/O devices that are accessible to the initiator device over the first network. In response to the first query to the switch on the first network, the unique address of each I/O device is received from the switch. A second query is submitted over the second network to the switch for information on switch ports on the switch. In response to the second query to the switch over the second network, the information on the switch ports is received. Information on a topology of the switch ports and the initiator and I/O devices having the unique address is generated.

In further implementations, at least one I/O device is attached to a loop that is attached to the switch port through which the device connects to the switch.

In still further implementations, in response to the first query to the switch over the first network, switch addresses are received. The switch assigns the switch addresses to the I/O devices attached to the switch ports. The topology information is generated to include the received switch addresses for the I/O devices.

In yet further implementations, an additional query is submitted on the second network to at least one other initiator device connected to one switch port, wherein the at least one other initiator device generates topology information to determine topology information for I/O devices to which the at least one other initiator device is capable of communicating on the switch. The topology information is updated with topology information received in response to the query on the second network to the at least one other initiator device.

Further, the initiator device generates the topology information for I/O device ports and initiator ports, wherein each I/O device and the initiator device are capable of including multiple ports.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
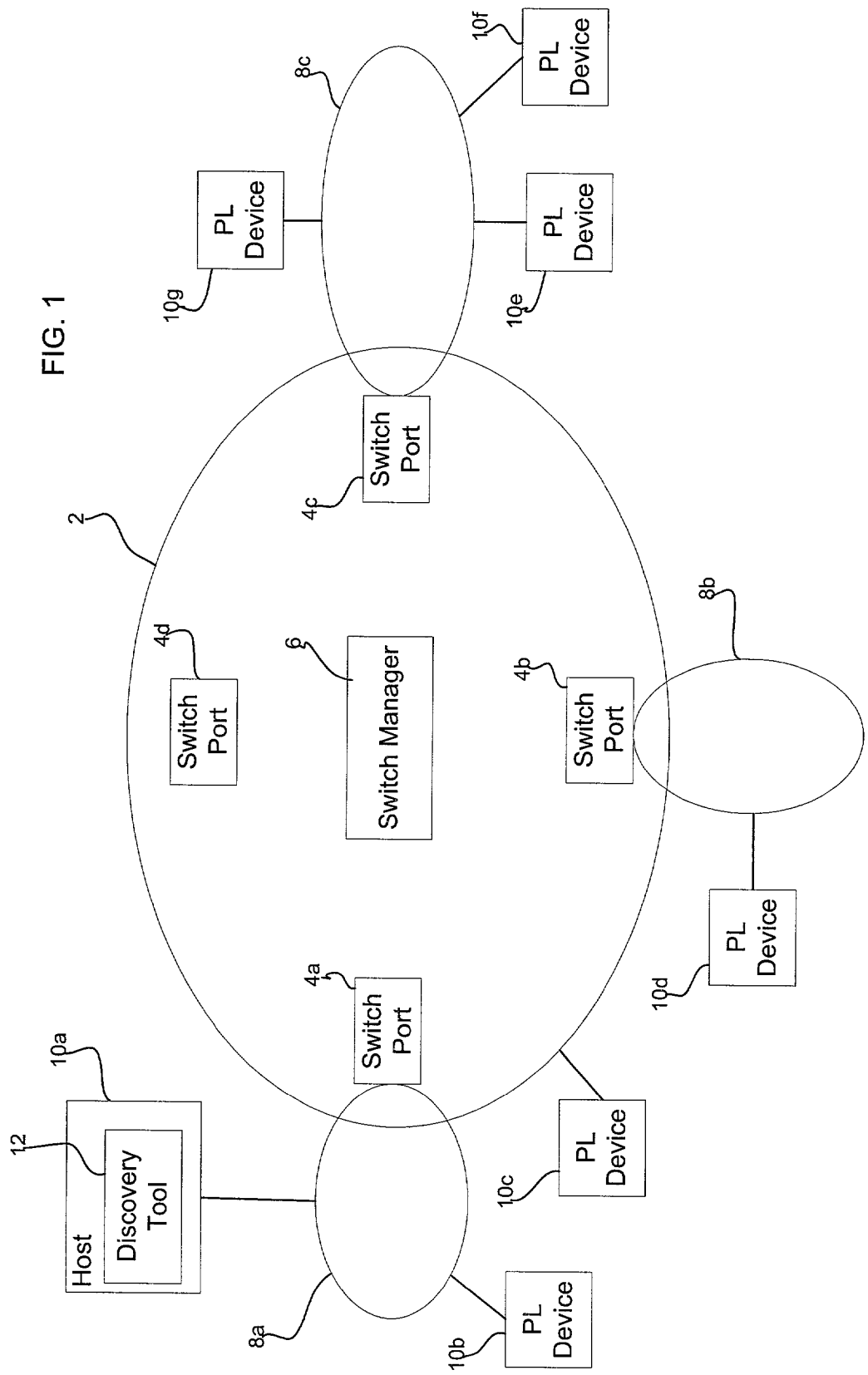
FIGS. 1, 2, and 3 illustrate network topologies in which the invention is implemented.

FIG. 1 illustrates a switch implementation. A switch 2 includes a plurality of switch ports 4a, 4b, 4c, 4d and a switch manager 6 which includes the programs to perform the switch management operations, such as switch 2 initialization, configuration, and management. One or more of the switch ports 4a, 4b, 4c, 4d may have an attached private loop 8a, 8b, 8c of private loop (PL) devices 10a, 10b, 10c, d, 10e, 10f, 10g, which may comprise any type of device, such as storage devices, hosts, servers, etc., that communicate using an eight bit AL_PA address. For instance, the private loop devices 10a, 10b . . . 10g may comprise legacy devices that are configured to communicate on an arbitrated loop using only an eight bit AL_PA and would not have the full 24 bit Fibre Channel address to communicate on a Fibre Channel fabric.

In certain implementations, during initialization, the switch manager 6 assigns each device port 10a, 10b . . . 10g a unique eight bit Arbitrated Loop Physical Address (AL_PA), so that the switch ports 4a, 4b, 4c, 4d themselves are addressable using the eight bit AL_PA address. Further, the switch manager 6 would assign each of the private loop devices 10a, 10b . . . 10g a unique eight bit AL_PA address, thereby configuring all the switch ports 4a, 4b, 4c, 4d and private loop devices 10a, 10b . . . 10g as a single Fibre Channel Arbitrated Loop that utilizes the eight bit AL_PA addressing scheme. In FIG. 1, one of the private loop devices 10a, b . . . g comprises a host system 10a that includes a discovery tool 12. Although only one host 10a is shown in FIG. 1, the topology may include any number of host systems and private loop devices attached to the loops 8a, 8b, 8c, limited by the capacity of the switch.

Figure 3:
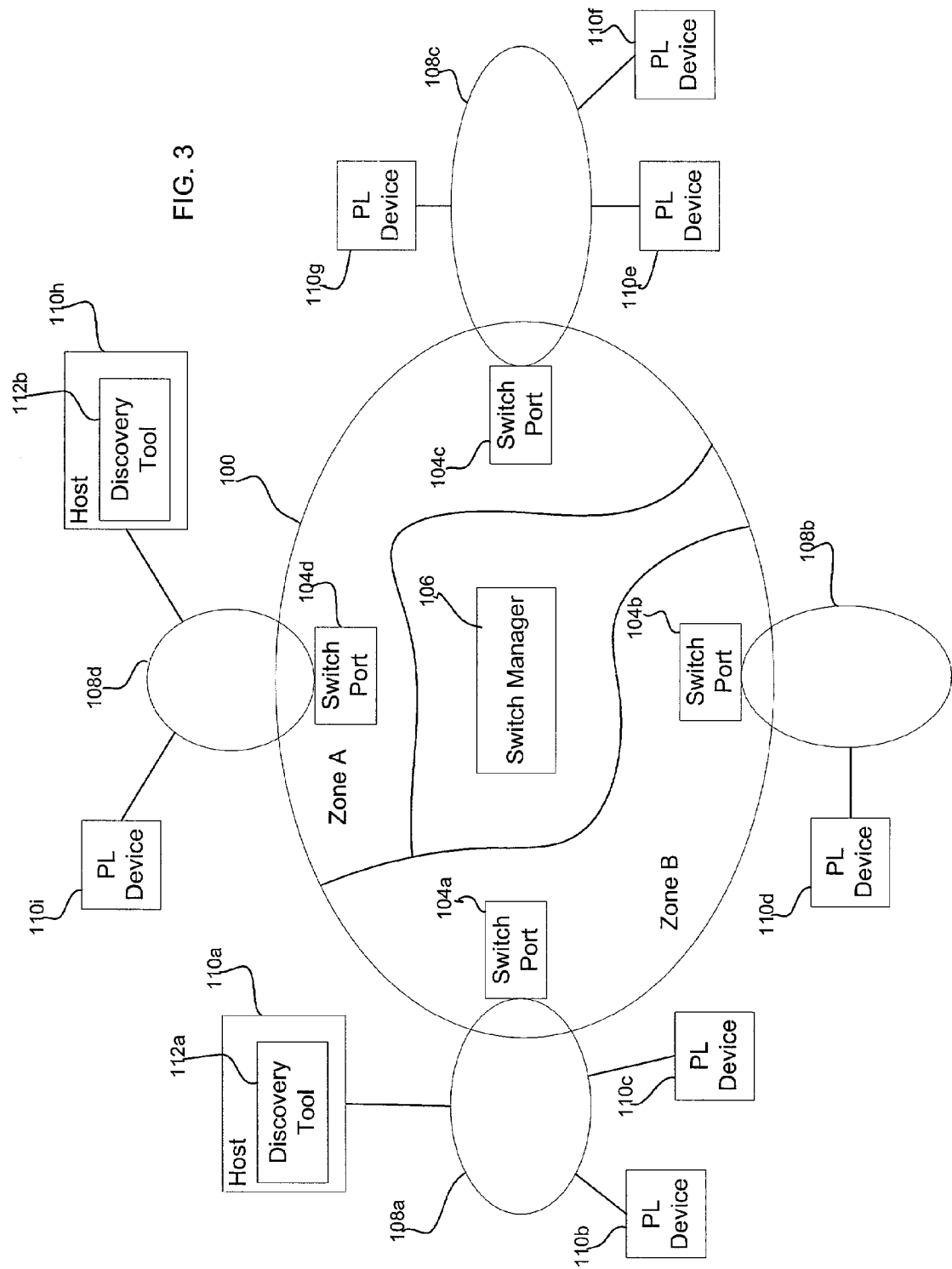

The switch manager 6 may assign an address to each device port. Thus, if the device, e.g., host, storage device, etc., includes adaptor cards with multiple ports, each port providing a communication channel to the device would be assigned a unique AL_PA address, as well as have a unique address, such as a worldwide name. Additionally, each device having multiple ports may have a world wide name (WWN) which is the address of the device node aggregating multiple ports. The line shown in FIGS. 1 and 3 illustrating the connection from the loops 8a, 8b, 8c, d to the private loop devices 10a, 10b . . . 10g should be interpreted to include multiple lines connecting the loop to the device 10a, 10b . . . 10g if the device 10a, 10b . . . 10g has multiple ports connecting to the loop 8a, 8b, 8c . . .

In the implementation of FIG. 1, all the switch ports 4a, 4b, 4c, 4d and private loop devices 10a, 10b . . . 10g on separate private loops 8a, 8b, 8c behave as one large private loop. An example of a Fibre Channel technology that configures switch ports 4a, 4b, 4c, 4d and private loop devices 10a, 10b . . . 10g as a single arbitrated loop is the segmented loop topology implemented in the QLogic Corporation's SANbox** 16STD Fibre Channel Switch, described in the QLogic publication "SANbox-16STD Fibre Channel Switch: Installer's/User's Manual," which was incorporated by reference above. The switch manager 6 may include functionality offered by the QLogic SANsurfer switch management application program, described in the QLogic Publication "SANbox-8/16 Switch Management User's Manual, QLogic Publication No. 59010-06 Rev. A (July, 2001), which publication is incorporated herein by reference in its entirety. The discovery tool 12 is an application program that may be run on any host to determine the physical topology of all the devices attached to the switch 2, including all the loop segments 8a, 8b, 8c that function as one large arbitrated loop.

Figure 2:
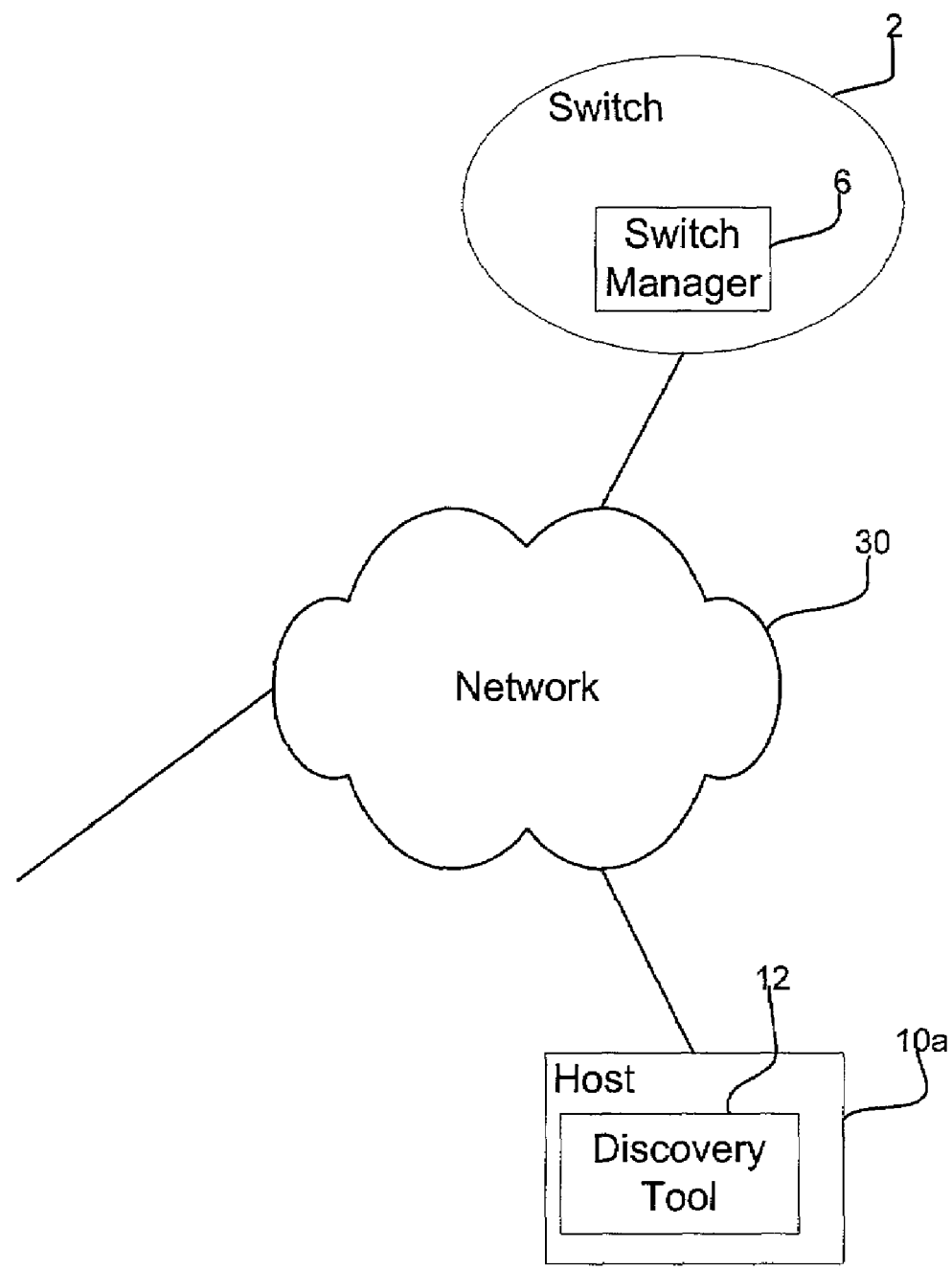

The switch manager 6 controls switch 2 management. The switch manager 6 is also assigned an Internet Protocol (IP) address to allow communication with the switch manager 6 over an additional network, such as a Local Area Network (LAN) utilizing alternative network technology, such as Ethernet network technology. FIG. 2 illustrates an additional network 30, such as an Ethernet LAN, that enables communication between the switch manager 6 and certain private loop devices 10a, 10b . . . 10g, such as host 10a and any other hosts. The network 30 is out-of-band with respect to the Fibre Channel communication enabled by the switch 2. In certain implementations, the switch manager 6 implements a web based management tool that allows hosts 10a connected to the switch 2 to access and control the switch manager 6 using a web interface, such as a Hypertext Transfer Protocol (HTTP) web browser, over the network 30. The discovery tool 12 would communicate with the switch manager 6 over the network 30 using switch Application Programming Interfaces (APIs), which allow the discovery tool 12 to query the switch manager 6 for information on the switch 2 and devices attached to the switch 2.

The host 10a executes the discovery tool 12 to discover the topology of all the private loop devices 10a, 10b . . . 10g and switch ports 4a, b, c d on the switch 2. Certain types of switches 2, such as the QLogic SANbox switches discussed above, implement a non-standard topology, such as the QLogic segmented loop topology. Such non-standard switch topologies, such as the QLogic segmented loop technology, do not support standardized Fibre Channel methods for obtaining connectivity information, e.g., the standard Fibre Channel discovery techniques described in the publication "Fibre Channel Generic Services-3 (FC-GS-3), Rev. 7.01 ", proposed draft published by the American Nat'l Standard of Information Technology (Nov. 28, 2000), which publication is incorporated herein by reference in its entirety.

FIG. 3 illustrates an implementation of the topology of FIG. 1 where the switch ports 104a, 104b, 104c, 104d on the switch 100 chassis are configured into separate zones A and B, such that any loop device 110a, 110b . . . 110i or other device attached to a switch port 104a, 104b, 104c, 104d in one particular zone can only communicate with other devices attached to the same switch port 4a, 4b, 4c, 4d or other switch ports in the same zone. FIG. 3 illustrates two zones, zones A and B, where zone A includes switch ports 104a and 104b, and all the loop devices 110a, 110b, 110c, 110d attached thereto, and zone B includes switch ports 104c and 104d and the loop devices 110e, 110f, 110g, 110h, and 110i attached thereto. In FIG. 3, each zone A and B includes one host 110a and 110h, respectively, where each host 110a and 110h runs an instance of the discovery tool 112a and 112b, respectively. In certain implementations, during initialization, the switch manager 206 would assign eight bit AL_PA addresses to devices within a zone, such that the same eight bit AL_PA may be assigned to devices 110a, 110b . . . 110i that are in different zones on the switch 200. For this reason, when mapping the topology for the switch 100, the discovery tool 112a and 112b must map devices and switch ports to their designated zone as devices and switch ports in different zones may have the same AL_PAs.

Figure 4:
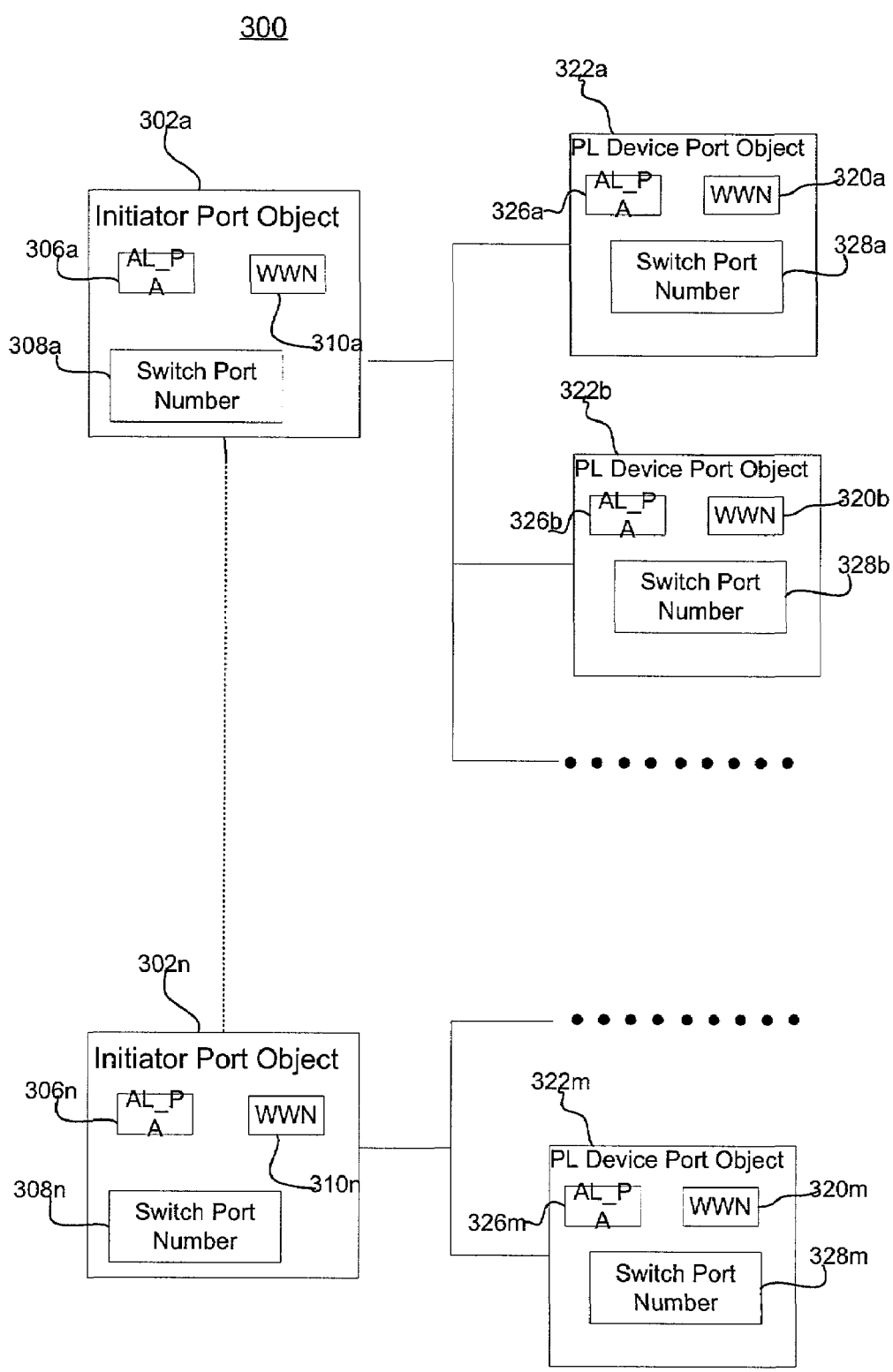
FIG. 4 illustrates an arrangement of data objects providing information on the topology determined by the logic of FIGS. 5 and 6 in accordance with implementations of the invention.

FIG. 4 illustrates an arrangement of information in a topology database 300 on all the initiator and target devices attached to a switch. In described implementations, an initiator comprises any type of device that initiates an Input/Output (I/O) operation and the target device is the device that receives the I/O operations. The initiator may comprise a host device or a port on an adaptor card in a host system, or any other type of system initiating an I/O request. Additionally, the target device may comprise a storage system or any other device capable of handling an I/O request. The target may comprise the storage device or a port on an adaptor card in the storage device. The database 300 includes a plurality of initiator port objects 302a . . . 302n, one for each initiator port on a host (initiator) device, e.g., 112a, b. Each initiator port object 302a . . . 302n includes the AL_PA 306a . . . 306n and world wide name (WWN) 310a . . . 310n of the initiator port as well as the switch port number 308a . . . 308n to which the initiator port is attached. Each initiator port object is associated with one or more private loop (PL) device port objects 322a, 322b . . . 322m which identify a target device port capable of being accessed by the initiator port through the switch. Each PL device port object 322a, 322b . . . 322m includes the AL_PA 326a . . . 326m and world wide name (WWN) 330a . . . 330m of the device port as well as the switch port number 328a . . . 328n to which the device port is attached. From the information in the topology database 300, the entire mapping of private loop devices to switch ports can be determined. Those skilled in the art will appreciate that there are numerous database implementations, such as relational and object oriented databases, that may be used to maintain the information shown in FIG. 7 as well as the association of initiator ports and target devices through the switch. Still further, additional information on the devices to that shown herein may be maintained in the topology database 300.

Figure 5:
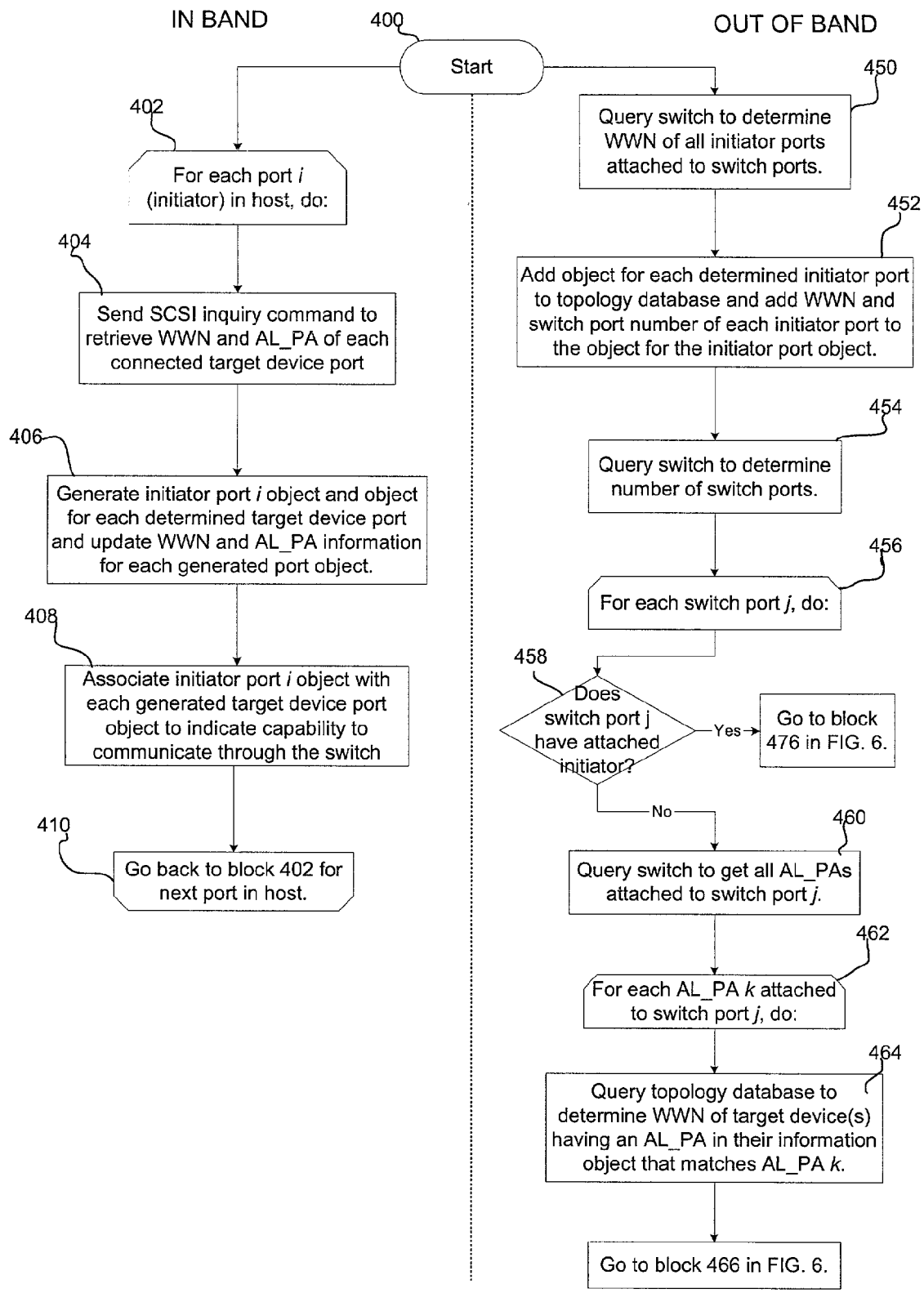
FIGS. 5 and 6 illustrate logic to discover the topology illustrated in FIGS. 1 and 3 in accordance with implementations of the invention.
Figure 6:
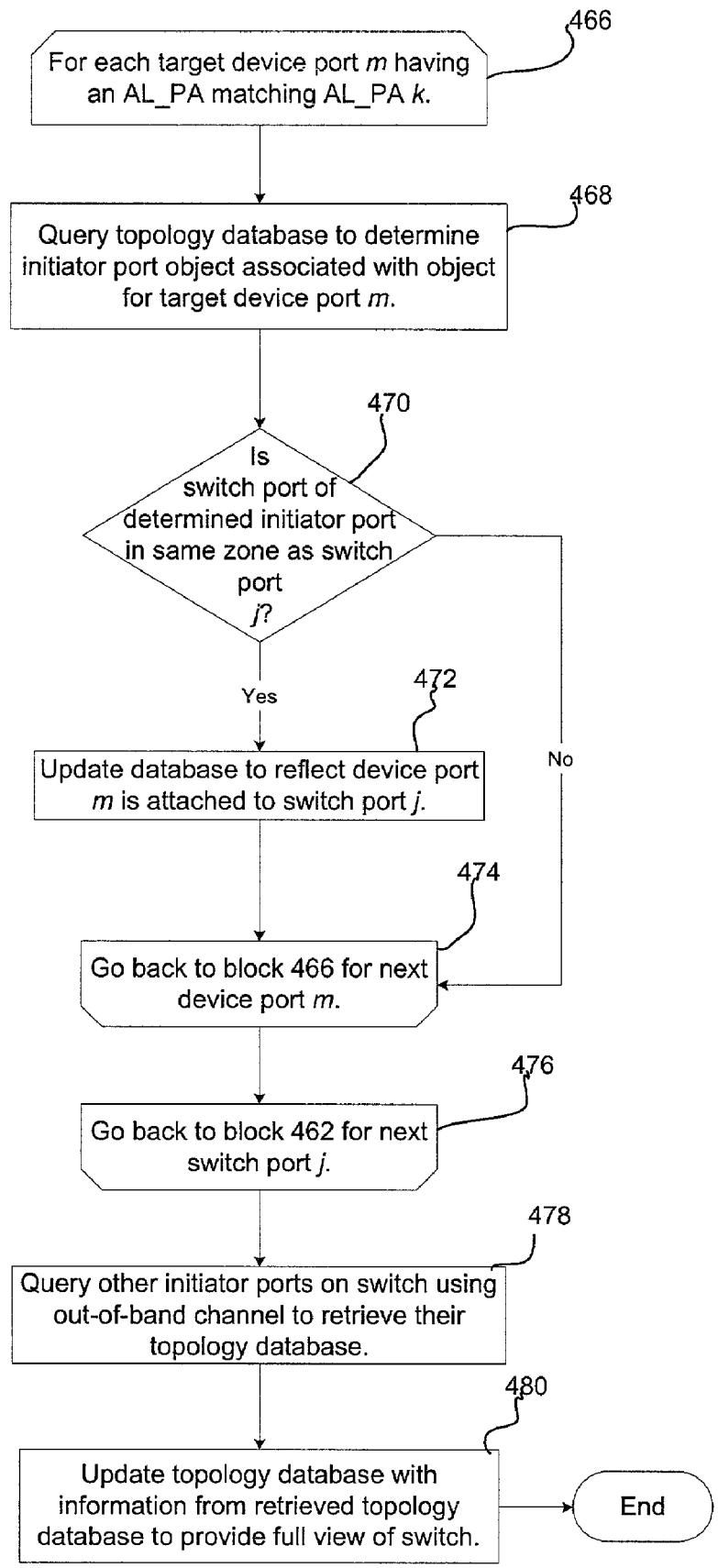

FIGS. 5 and 6 illustrate logic implemented in the discovery tool 12, 112a, 112b to allow the host 10a, 110a, 110h (FIGS. 1 and 3), respectively, to determine the physical topology using both in-band (Fibre Channel through the switch ports 4a, 4b, 4c, 4d) and out-of-band (network 30 in FIG. 2) communication. The topology may be discovered by any host connected to the switch 2 that executes the discovery tool 12. Upon discovering the topology, the discovery tool 12, 112a, 112b would generate the information for the topology database 300 shown in FIG. 4. With respect to FIG. 5, control begins at block 400 with the discovery tool 12, 112a, 112b being invoked to generate the topology database 300. From block 400, control proceeds to both blocks 402 and 450, where the discovery tool 12 can invoke separate processes to handle the separate in-band and out-of-band operation flows. The steps from block 402 utilize in-band communication using Fibre Channel protocol through the switch 2, 100 and the steps from blocks 450 utilize the out-of-band communication using the network 30 (FIG. 2) and switch Application Programming Interfaces (APIs) to query the switch 2, 112 for information.

For the in-band communication, a loop is performed at blocks 402 through 410 for each initiator port i on the host 12, 112a, 112b in which the invoked discovery tool 12, 112a, 112b is executing. The discovery tool 12, 112a, 112b sends an inquiry command, such as a Small Computer System Interface (SCSI) inquiry command, using the in-band Fibre Channel network, to obtain the world wide name (WWN) and AL_PA for every target device (e.g., 10b, 10c . . . 10f in FIG. 1 and 110b, 110c . . . 110c in FIG. 3) port attached to the switch 12, 112. Note that if the initiator in which the discovery tool 12, 112a, 112b is executing is within a particular zone, then the in-band inquiry command would not discover target devices in other zones. The discovery tool 12, 112 then generates (at block 406) an initiator i port object 302a and device port objects 322a, 322b . . . (FIG. 4) for each target device port determined from the inquiry command and updates the generated objects with the world wide name (WWN) and AL_PA for the ports determined from the inquiry command. The initiator port i object 302a is then associated (at block 408) with each of the generated device port objects 322a, 322b . . . to which the initiator port i can communicate. Control then proceeds (at block 410) back to block 402 to generate topology information for the next initiator port in the host 10, 110a, h in which the discovery tool 12, 112a, 112b is executing.

The discovery tool 12, 112a, 112b may begin the out-of-band operations from block 450 while the in-band operations at blocks 402 through 412 are executing or after 402 through 410 has completed. At block 450, the discovery tool 12, 112a, 112b uses switch APIs to query the switch 2, 100 to determine the world wide name (WWN) of all initiator ports attached to any of the switch ports 4a, 4b, 4c, 4d (FIG. 1) and 104a, 104b, 104c, 104d (FIG. 3). The topology database 300 is updated (at block 452) to include an initiator port object 302b . . . 302n for each determined initiator port and the WWN 310b . . . n and switch port number 308b . . . n fields in each generated initiator port object 302b are updated to include the WWN and switch port number determined when querying the switch at block 450. Note that because this communication is out-of-band, the determined initiator ports may be in different zones from the initiator ports in the host 10, 110a, 110h in which the discovery tool 12, 112a, 112b is executing. The switch 2, 100 is then queried (at block 454) to determine the number of switch ports 4a, 4b, 4c, 4d, 104a, 4b, 4c, 4d (FIGS. 1 and 3).

For each determined switch port j, a loop is performed at blocks 456 through 476. If switch port j does not have an attached initiator, then the discovery tool 12, 112a, 112b queries (at block 460) the switch 2, 100 to get all of the AL_PAs of target device ports attached to the switch port j. There may be multiple AL_PAs attached to switch port j if switch port j is attached to an arbitrated loop 8a, 8b, 8c, 108a, 8b, 8c (FIGS. 1 and 3). A loop is then performed at blocks 462 through 476 for each determined AL_PA k. At block 464, the discovery tool 12, 112a, 112b queries the topology database 300 to determine the WWN 320a, b . . . of device port objects 322a, b . . . having an AL_PA value 326a, b . . ., which would have been indicated in the device port object 322a, b . . . at step 406, that matches AL_PA k.

In other words, the determined target device port having AL_PA k attached to switch port j is in-band with respect to the host 10a, 110a, 110h including the discovery tool 12, 112a, 112b.

With respect to FIG. 6, a loop is then performed at blocks 466 through 474 for each target device port m having an AL_PA matching $AL_{13}$ PA k. At block 468, the discovery tool 12, 112a, 112b queries the topology database 300 to determine the initiator port object 302a of the source host 10a, 110a, 110h associated with the target device port m object 322a, b . . . If (at block 470) the switch port of 308a of the determined initiator port object 302a is in the same zone as switch port j, to which the target device port m is attached, then the topology database 300 is updated (at block 472) to reflect that the switch port number 328a, 328b . . . in the device port m object is switch port j. If (at block 470), the switch port of the determined initiator port is in a different zone, then such different zone also includes target device port m. From the no branch of block 470 or block 472, control proceeds (at block 474) to block 466 to consider the next determined target device port m.

After updating the switch port numbers 328a, 328b . . . for all of the device port objects 322a, b . . . n associated with the initiator port object 302a, control proceeds (at block 476) back to block 462 to process the next AL_PA k. After considering all AL_PAs attached to the switch port j, control proceeds (at block 478) back to block 456 to consider the next switch port 4a, 4b, 4c, 4d, 104a, 4b, 4c, 4d (FIGS. 1 and 3). The result of the in-band and out-of-band processing at blocks 402–410 and blocks 450–478 is the topology database 300 having information objects for all the initiator ports within the host 10a, 112a, h from which the discovery tool 12, 112a, 112b is executing and for each target device to which the initiator ports can communication through the switch 2, 100, including the world wide name (WWN), AL_PA, and switch port number for the initiator ports and all the associated target device ports.

If (at block 458 in FIG. 5) an initiator port is attached to switch port j, then control proceeds to block 476 to consider the next switch port. After updating, the topology database 300 includes information on the target devices attached to the switch port to which the host 10a, 110a, 110h can communicate, which includes those target devices in the same zone as the host. In such case, control proceeds to 478 to obtain information on target devices, including target devices in zones outside of the zone including the host invoking the discovery tool 12, 112a, 112b operations at block 400 (FIG. 5) At block 478, the discovery tool 12, 112a, 112b queries (at block 478) other host through their initiator port to retrieve the topology database 300 generated by the discovery tool 12, 112a, 112b executing in the queried initiator port. The discovery tool 12, 112a, 112b would include APIs to allow discovery tools executing in hosts to query other hosts for the topology databases 300 generated by the discovery tools 12, 112a, 112b, thereby allowing a sharing of topology databases 300 to provide topology information for all initiator and target devices attached to the switch, including information on target devices in other zones. At block 480, the discovery tool 12, 112a, 112b updates the topology database 300 with information from the retrieved topology database 300 to provide a full view of the devices attached to the switch. Because the queried initiator ports may be in different zones, the discovery tool 12, 112a, 112b is capable of updating its topology database 300 with the topology of devices in other zones that is provided by discovery tools executing in hosts having initiator ports in different zones.

With the above described implementations, a host that is attached to an arbitrated loop, such as one of the private arbitrated loops 108a, 108b, 108c, 10d, that is attached to a switch 2 that does not implement standard Fibre Channel discovery protocols may nevertheless ascertain the topology of the devices that are attached to switch ports on the same switch. For instance, in implementations where the switch 2, 100 is utilizing the segmented loop technology of QLogic, the described implementations allow hosts to discover the topology of all hosts and devices attached to loops on the segmented loop switch ports of the switch when all the devices are assigned a unique eight bit AL_PA.

Additional Implementation Details

The above described method, apparatus or article of manufacture for discovering a switch topology may be implemented using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Certain implementations concerned a switch that utilized the segmented loop technology developed by QLogic. However, those skilled in the art will recognize that the discovery techniques described herein may apply to any other switch technologies that do not enable all the Fibre Channel discovery tools. In such case, the described discovery implementations may be used to gather device information from both a switch manager program and the devices themselves using a combination of in-band and out-of-band communications.

The described implementations provide a discovery technique used in a Fibre Channel architecture to allow discovery of devices attached to a Fibre Channel network that utilize an 8 bit AL_PA addressing scheme. However, those skilled in the art will appreciate that the discovery techniques of the described implementations may be utilized with network transmission protocols other than Fibre Channel when groups of devices in the network use different addressing schemes. Accordingly, the invention is not limited to the Fibre Channel protocol environment, but may also be used to discover the topology of a switched network in non-Fibre Channel environments when information may be gathered by accessing the devices in the topology through different networks.

In described implementations, the switch 2, 200 configured the switch ports and loop devices to have an eight bit AL_PA address. In alternative implementations, alternative addressing schemes may be used.

The topology of FIGS. 1, 2 and 7 are provided for illustration. The described address mapping implementations may apply to any switch topology involving any number of interconnected switches, switch ports, and devices attached to either the switch port directly or through a loop attached to the switch port.

The described implementations involved the discovery of devices attached to ports on a single switch. In additional implementations, the discovery techniques of the described implementations may be used to discover devices across switches in the same fabric.

In the described implementations, the discovery tool was executed from a host system 10a, 110a, 110h. Additionally, the discovery tool may be executed on loop or non-loop devices other than hosts, such as a network appliance capable of performing logical I/O operations and capable of both in-band communication with the switch on a switch implemented network, e.g., the SAN, and out-of-band communication with other network devices on an additional network, e.g., an Ethernet.

In the described implementations, the loop devices and switch ports were queried for information concerning their eight bit AL_PA and world wide name. Additionally, the loop devices and switch ports may be queried for additional information on the device that may be added to the switch port and loop device objects in the mapping.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for discovering a topology of a switch from an initiator device, wherein the switch includes a plurality of switch ports, wherein a plurality of Input/Output (I/O) devices are connected to the switch ports, wherein each I/O device and the initiator device connect to the switch through one of the switch ports, wherein the initiator and I/O devices communicate on a first network configured by the switch, wherein the initiator device communicates with the switch over a second network, and wherein the initiator device performs:
submitting a first query from the initiator device over the first network to the switch requesting a unique address of a plurality of I/O devices that are accessible to the initiator device over the first network;
receiving, in response to the first query to the switch on the first network, the unique address of each I/O device from the switch;
submitting a second query from the initiator device over the second network to the switch for information on switch ports on the switch;
receiving, in response to the second query to the switch over the second network, the information on the switch ports; and
generating information on a topology of the switch ports and the initiator and I/O devices having the unique address.

2. The method of claim 1, wherein at least one I/O device is attached to a loop, wherein the loop is attached to the switch port through which the device connects to the switch.

3. The method of claim 2, wherein each loop comprises a Fibre Channel Arbitrated Loop, and wherein each unique address comprises an eight bit Arbitrated Loop Physical Address.

4. The method of claim 2, further comprising:
receiving, in response to the first query to the switch over the first network, switch addresses the switch assigns to the I/O devices attached to the switch ports, wherein the topology information is generated to include the received switch addresses for the I/O devices.

5. The method of claim 4, wherein the switch addresses comprises an Arbitrated Loop Physical Address.

6. The method of claim 1, wherein the first network comprises a Fibre Channel network and wherein the second network comprises an Ethernet network, wherein the switch and less than all of the devices are connected to the second network.

7. The method of claim 1, wherein the unique address for each device is a world wide name (WWN) of the device.

8. The method of claim 1, wherein the switch and switch ports implement segmented loop technology.

9. The method of claim 1, wherein the initiator device further performs:
submitting an additional query on the second network to at least one other initiator device connected to one switch port, wherein the at least one other initiator device generates topology information to determine topology information for I/O devices to which the at least one other initiator device is capable of communicating; and
updating the topology information with topology information received in response to each additional query on the second network from the at least one other initiator device.

10. The method of claim 9, wherein the topology information received in response to the additional query to the at least one other initiator device is capable of including topology information on I/O devices in different zones implemented by the switch.

11. The method of claim 1, wherein the I/O devices include storage systems and initiator devices.

12. The method of claim 1, wherein there is one unique address for each I/O device and initiator included in the topology information, wherein each I/O device and initiator is capable of including multiple ports.

13. The method of claim 1, wherein there is one unique address for each port in the I/O devices and initiators included in the topology information.

14. The method of claim 13, further comprising:
receiving, in response to the first query to the switch over the first network, a switch address assigned to each I/O device port, wherein the generated topology information provides the switch address for each initiator device port and I/O device port.

15. The method of claim 14, further comprising:
after obtaining information on all the switch ports on the switch, submitting at least one additional query to the switch for the switch addresses of all I/O device ports connecting to each switch port;

receiving, in response to the at least one additional query, the switch address for each I/O device port connecting to each switch port;

determining, from the topology information, each I/O device port whose switch address matches one switch address included in the received response to the at least one additional query; and updating the topology information to include the switch port with the I/O device port whose switch address matches one switch address identified in the received response to the third query as connecting to the switch port.

16. The method of claim 15, wherein the topology information is updated for I/O device ports attached to one switch port in the same zone as the initiator device.

17. The method of claim 16, wherein at least one other initiator device generates topology information to determine topology information for I/O devices to which the at least one other initiator device is capable of communicating, further comprising:

querying the at least one other initiator device to obtain the topology information generated by the at least one other initiator device; and updating the topology information with topology information received in response to querying the at least one other initiator device, wherein the topology information received from the at least one other initiator device is capable of including I/O devices in other switch zones.

18. A system for discovering a network topology, comprising:

(a) a switch having a plurality of switch ports;

(b) at least one I/O device, wherein each I/O device is connected to one switch port;

(c) an initiator device connected to one switch port;

(d) a first network configured by the switch, wherein the initiator and I/O devices communicate on the first network through the switch ports;

(e) a second network on which the initiator device and switch communicate;

(f) a computer readable medium within the initiator device including code executed by the initiator device, wherein the code causes the initiator device to perform:

(i) submitting a first query from the initiator device over the first network to the switch requesting a unique address of a plurality of I/O devices that are accessible to the initiator device over the first network;

(ii) receiving, in response to the first query to the switch on the first network, the unique address of each I/O device from the switch;

(iii) submitting a second query from the initiator device over the second network to the switch for information on switch ports on the switch;

(iv) receiving, in response to the second query over to the switch over the second network, the information on the switch ports; and (v) generating information on a topology of the switch ports and the initiator and I/O devices having the unique address.

19. The system of claim 18, further comprising:

a loop attached to one switch port, wherein at least one I/O device is attached to the loop, wherein the loop is attached to the switch port through which the device connects to the switch.

20. The system of claim 19, wherein each loop comprises a Fibre Channel Arbitrated Loop, and wherein each unique address comprises an eight bit Arbitrated Loop Physical Address.

21. The system of claim 19, wherein the code further causes the initiator device to perform:

receiving, in response to the first query to the switch over the first network, switch addresses the switch assigns to the I/O devices attached to the switch ports, wherein the topology information is generated to include the received switch addresses for the I/O devices.

22. The system of claim 21, wherein the switch addresses comprises an Arbitrated Loop Physical Address.

23. The system of claim 18, wherein the first network comprises a Fibre Channel network and wherein the second network comprises an Ethernet network, wherein the switch and less than all of the devices are connected to the second network.

24. The system of claim 18, wherein the unique address for each device is a world wide name (WWN) of the device.

25. The system of claim 18, wherein the switch and switch ports implement segmented loop technology.

26. The system of claim 18, further comprising:

at least one other initiator device connected to one switch port, and wherein the code further causes the initiator device to perform:

(i) submitting an additional query on the second network to at least one other initiator device connected to one switch port, wherein the at least one other initiator device generates topology information to determine topology information for I/O devices to which the at least one other initiator device is capable of communicating; and (ii) updating the topology information with topology information received in response to each additional query on the second network from the at least one other initiator device.

27. The system of claim 26, wherein the topology information received in response to the additional query to the at least one other initiator device is capable of including topology information on I/O devices in different zones implemented by the switch.

28. The system of claim 18, wherein the I/O devices include storage systems and initiator devices.

29. The system of claim 18, wherein there is one unique address for each I/O device and initiator included in the topology information, wherein each I/O device and initiator is capable of including multiple ports.

30. The system of claim 18, wherein there is one unique address for each port in the I/O devices and initiators included in the topology information.

31. The system of claim 30, wherein the code further causes the initiator device to perform:

receiving, in response to the first query to the switch over the first network, a switch address assigned to each I/O device port, wherein the generated topology information provides the switch address for each initiator device port and I/O device port.

32. The system of claim 31, wherein the code further causes the initiator device to perform:

submitting, after obtaining information on all the switch ports on the switch, at least one additional query to the switch for the switch addresses of all I/O device ports connecting to each switch port;

receiving, in response to the at least one additional query, the switch address for each I/O device port connecting to each switch port;

determining, from the topology information, each I/O device port whose switch address matches one switch address included in the received response to the at least one additional query; and updating the topology information to include the switch port with the I/O device port whose switch address matches one switch address identified in the received response to the third query as connecting to the switch port.

33. The system of claim 32, wherein the topology information is updated for I/O device ports attached to one switch port in the same zone as the initiator device.

34. The system of claim 33, further comprising:

at least one other initiator device generating topology information to determine topology information for I/O devices to which the at least one other initiator device is capable of communicating;

wherein the code further causes the initiator to perform:
(i) querying the at least one other initiator device to obtain the topology information generated by the at least one other initiator device; and
(ii) updating the topology information with topology information received in response to querying the at least one other initiator device, wherein the topology information received from the at least one other initiator device is capable of including I/O devices in other switch zones.

35. A system for discovering a network topology, wherein an initiator device and at least one I/O device communicate on a first network, and wherein the initiator further communicates on a second network, comprising:

(a) a switch having a plurality of switch ports, wherein each I/O device and initiator device are connected to one switch port, wherein the wherein the switch includes code to perform:
 (i) configuring the first network, wherein the initiator and I/O devices communicate on the first network through the switch ports;
 (ii) communicating with the initiator device on the second network;

(b) a computer readable medium including code executed by the initiator device including code executed by the initiator device, wherein the code causes the initiator device to perform:
 (i) submitting a first query from the initiator device over the first network to the switch requesting a unique address of a plurality of I/O devices that are accessible to the initiator device over the first network;
 (ii) receiving, in response to the first query to the switch on the first network, the unique address of each I/O device from the switch;
 (iii) submitting a second query from the initiator device over the second network to the switch for information on switch ports on the switch;
 (iv) receiving, in response to the second query over to the switch over the second network, the information on the switch ports; and
 (v) generating information on a topology of the switch ports and the initiator and I/O devices having the unique address.

36. The system of claim 35, wherein the loop is attached to the switch port through which the device connects to the switch.

37. The system of claim 36, wherein the code further causes the initiator device to perform:

receiving, in response to the first query to the switch over the first network, switch addresses the switch assigns to the I/O devices attached to the switch ports, wherein the topology information is generated to include the received switch addresses for the I/O devices.

38. The system of claim 35, wherein additional initiator devices are connected to switch ports on the switch, wherein the code further causes the initiator device to perform:

submitting an additional query on the second network to at least one other initiator device connected to one switch port, wherein the at least one other initiator device generates topology information to determine topology information for I/O devices to which the at least one other initiator device is capable of communicating; and updating the topology information with topology information received in response to each additional query on the second network from the at least one other initiator device.

39. The system of claim 38, wherein the code further causes the initiator device to perform:

receiving, in response to the first query to the switch over the first network, a switch address assigned to each I/O device port, wherein the generated topology information provides the switch address for each initiator device port and I/O device port.

40. The system of claim 32, wherein the topology information is updated for I/O device ports attached to one switch port in the same zone as the initiator device.

41. The system of claim 40, wherein at least one other initiator device generates topology information to determine topology information for I/O devices to which the at least one other initiator device is capable of communicating, wherein the code further causes the initiator to perform:

querying the at least one other initiator device to obtain the topology information generated by the at least one other initiator device; and updating the topology information with topology information received in response to querying the at least one other initiator device, wherein the topology information received from the at least one other initiator device is capable of including I/O devices in other switch zones.

42. An article of manufacture including code for discovering a topology of a switch from an initiator device, wherein the switch includes a plurality of switch ports, wherein a plurality of Input/Output (I/O) devices are connected to the switch ports, wherein each I/O device and the initiator device connect to the switch through one of the switch ports, wherein the initiator and I/O devices communicate on a first network configured by the switch, wherein the initiator device communicates with the switch over a second network, and wherein the code causes the initiator device to perform:

submitting a first query from the initiator device over the first network to the switch requesting a unique address of a plurality of I/O devices that are accessible to the initiator device over the first network;

receiving, in response to the first query to the switch on the first network, the unique address of each I/O device from the switch;

submitting a second query from the initiator device over the second network to the switch for information on switch ports on the switch;

receiving, in response to the second query to the switch over the second network, the information on the switch ports; and generating information on a topology of the switch ports and the initiator and I/O devices having the unique address.

43. The article of manufacture of claim 42, wherein at least one I/O device is attached to a loop, wherein the loop is attached to the switch port through which the device connects to the switch.

44. The article of manufacture of claim 43, wherein each loop comprises a Fibre Channel Arbitrated Loop, and wherein each unique address comprises an eight bit Arbitrated Loop Physical Address.

45. The article of manufacture of claim 43, wherein the code further causes the initiator device to perform:

receiving, in response to the first query to the switch over the first network, switch addresses the switch assigns to the I/O devices attached to the switch ports, wherein the topology information is generated to include the received switch addresses for the I/O devices.

46. The article of manufacture of claim 45, wherein the switch addresses comprises an Arbitrated Loop Physical Address.

47. The article of manufacture of claim 42, wherein the first network comprises a Fibre Channel network and wherein the second network comprises an Ethernet network, wherein the switch and less than all of the devices are connected to the second network.

48. The article of manufacture of claim 42, wherein the unique address for each device is a world wide name (WWN) of the device.

49. The article of manufacture of claim 42, wherein the switch and switch ports implement segmented loop technology.

50. The article of manufacture of claim 42, wherein the initiator device further performs:

submitting an additional query on the second network to at least one other initiator device connected to one switch port, wherein the at least one other initiator device generates topology information to determine topology information for I/O devices to which the at least one other initiator device is capable of communicating; and updating the topology information with topology information received in response to each additional query on the second network from the at least one other initiator device.

51. The article of manufacture of claim 50, wherein the topology information received in response to the additional query to the at least one other initiator device is capable of including topology information on I/O devices in different zones implemented by the switch.

52. The article of manufacture of claim 42, wherein the I/O devices include storage systems and initiator devices.

53. The article of manufacture of claim 42, wherein there is one unique address for each I/O device and initiator included in the topology information, wherein each I/O device and initiator is capable of including multiple ports.

54. The article of manufacture of claim 42, wherein there is one unique address for each port in the I/O devices and initiators included in the topology information.

55. The article of manufacture of claim 54, wherein the code further causes the initiator device to perform:

receiving, in response to the first query to the switch over the first network, a switch address assigned to each I/O device port, wherein the generated topology information provides the switch address for each initiator device port and I/O device port.

56. The article of manufacture of claim 55, wherein the code further causes the initiator device to perform:

after obtaining information on all the switch ports on the switch, submitting at least one additional query to the switch for the switch addresses of all I/O device ports connecting to each switch port;

receiving, in response to the at least one additional query, the switch address for each I/O device port connecting to each switch port;

determining, from the topology information, each I/O device port whose switch address matches one switch address included in the received response to the at least one additional query; and updating the topology information to include the switch port with the I/O device port whose switch address matches one switch address identified in the received response to the third query as connecting to the switch port.

57. The article of manufacture of claim 56, wherein the topology information is updated for I/O device ports attached to one switch port in the same zone as the initiator device.

58. The article of manufacture of claim 57, wherein at least one other initiator device generates topology information to determine topology information for I/O devices to which the at least one other initiator device is capable of communicating, wherein the code further causes the initiator device to perform:

querying the at least one other initiator device to obtain the topology information generated by the at least one other initiator device; and updating the topology information with topology information received in response to querying the at least one other initiator device, wherein the topology information received from the at least one other initiator device is capable of including I/O devices in other switch zones.

* * * * *